United States Patent
Hull et al.

(10) Patent No.: US 7,254,937 B2
(45) Date of Patent: Aug. 14, 2007

(54) GAS TURBINE HEAT EXCHANGER ASSEMBLY AND METHOD FOR FABRICATING SAME

(75) Inventors: Peter R. Hull, Ipswich, MA (US); Robert Vandermolen, Peabody, MA (US)

(73) Assignee: General Electric Company, Schenectady, NY (US)

( * ) Notice: Subject to any disclaimer, the term of this patent is extended or adjusted under 35 U.S.C. 154(b) by 93 days.

(21) Appl. No.: 10/828,663

(22) Filed: Apr. 21, 2004

(65) Prior Publication Data

US 2005/0235626 A1    Oct. 27, 2005

(51) Int. Cl.
*F02C 7/10* (2006.01)

(52) U.S. Cl. .................... 60/266; 60/39.511
(58) Field of Classification Search ........... 60/39.511, 60/266
See application file for complete search history.

(56) References Cited

U.S. PATENT DOCUMENTS

| | | | |
|---|---|---|---|
| 2,925,714 A * | 2/1960 | Cook ................ | 60/39.511 |
| 2,969,642 A * | 1/1961 | Colby ............... | 60/39.511 |
| 3,201,938 A * | 8/1965 | Zirin ................ | 60/39.511 |
| 3,222,864 A * | 12/1965 | Dyste et al. ........ | 60/39.511 |
| 3,386,243 A * | 6/1968 | Beam, Jr. et al. ... | 60/39.511 |
| 3,701,381 A * | 10/1972 | Watts ............... | 165/82 |
| 3,735,588 A * | 5/1973 | Moskowitz et al. ... | 60/39.511 |
| 4,050,242 A | 9/1977 | Dusa | |
| 5,396,760 A | 3/1995 | Hines | |
| 6,050,082 A | 4/2000 | Leonard et al. | |

* cited by examiner

*Primary Examiner*—Ted Kim
(74) *Attorney, Agent, or Firm*—William Scott Andes Armstrong Teasdale LLP

(57) ABSTRACT

A method for assembling a gas turbine engine including a compressor and a combustor includes providing a heat exchanger assembly that includes at least one heat exchanger, and coupling the heat exchanger assembly to the gas turbine engine such that the heat exchanger is positioned substantially concentrically with respect to a gas turbine engine axis of rotation, and such that the heat exchanger is configured to channel compressor discharge air from the compressor discharge air to the combustor.

14 Claims, 6 Drawing Sheets

GAS TURBINE HEAT EXCHANGER ASSEMBLY AND METHOD FOR FABRICATING SAME

BACKGROUND OF THE INVENTION

This invention relates generally to gas turbine engines, and more particularly to heat exchangers used with gas turbine engines.

At least one known gas turbine engine uses a heat exchanger, generally referred to as a recuperator, to facilitate reducing specific fuel consumption. More specifically, pressurized air from the compressor section of the gas turbine engine is channeled from the gas turbine engine, and through the heat exchanger, such that the hot exhaust gases of the engine raise the operating temperature of the pressurized air prior to it being supplied into the combustor.

Known heat exchanger assemblies are positioned between the gas turbine engine exhaust gas box and the exhaust stack. At least some known heat exchanger assemblies include a pair of heat exchangers coupled in a parallel spaced relationship such that a space known as a bypass duct is defined therebetween. The bypass duct is closable by a butterfly valve. However, since known heat exchangers are typically physically large and rectangular-shaped, such heat exchangers are mounted externally to the gas turbine engine. Accordingly, the compressor discharge air and the engine exhaust gas is routed to and from the heat exchangers through a ducting which couples the heat exchangers to the gas turbine engine. As a result, known heat exchanger assemblies occupy a relatively large volume which is often larger than a volume occupied by the gas turbine engine itself. The resulting large and irregular heat exchanger assembly, coupled with the added weight and cost of the heat exchanger and ducting, generally makes regenerative engine systems unfeasible for aircraft applications.

In addition, although recuperated engines generally achieve a better low power specific fuel consumption than other known gas turbine engines, when such engines are operated with a heat exchanger assembly and at a higher operating power, gas-side total pressure losses of the hot exhaust gas stream may be relatively high through the exhaust system heat exchanger. The increased gas-side pressure losses caused by the heat exchanger assembly may result in an increased specific fuel consumption. Moreover, since the size of the heat exchanger is generally desired to be as small as possible, less space is available for a bypass system, which may result in high exhaust total pressure losses during high-power engine operating conditions.

BRIEF DESCRIPTION OF THE INVENTION

In one aspect, a method for assembling a gas turbine engine is provided. The method includes providing a heat exchanger assembly that includes at least one heat exchanger, and coupling the heat exchanger assembly to the gas turbine engine such that the heat exchanger is positioned substantially concentrically with respect to a gas turbine engine axis of rotation, and such that the heat exchanger is configured to channel compressor discharge air from the compressor discharge air to the combustor.

In another aspect, a heat exchanger assembly for a gas turbine engine is provided. The heat exchanger is coupled in flow communication to a compressor. The heat exchanger is configured to channel compressor discharge air to a combustor. The heat exchanger assembly is coupled to the gas turbine engine such that the heat exchanger is substantially concentrically aligned with respect to an axis of rotation of the gas turbine engine.

In a further aspect, a gas turbine engine is provided. The gas turbine engine includes a compressor, a combustor downstream from the compressor, a turbine coupled in flow communication with the combustor, and a heat exchanger assembly. The heat exchanger is configured to channel compressor discharge air to a combustor. The heat exchanger assembly is coupled to the gas turbine engine such that the heat exchanger is substantially concentrically aligned with respect to an axis of rotation of the gas turbine engine.

DETAILED DESCRIPTION OF THE INVENTION

Figure 1:
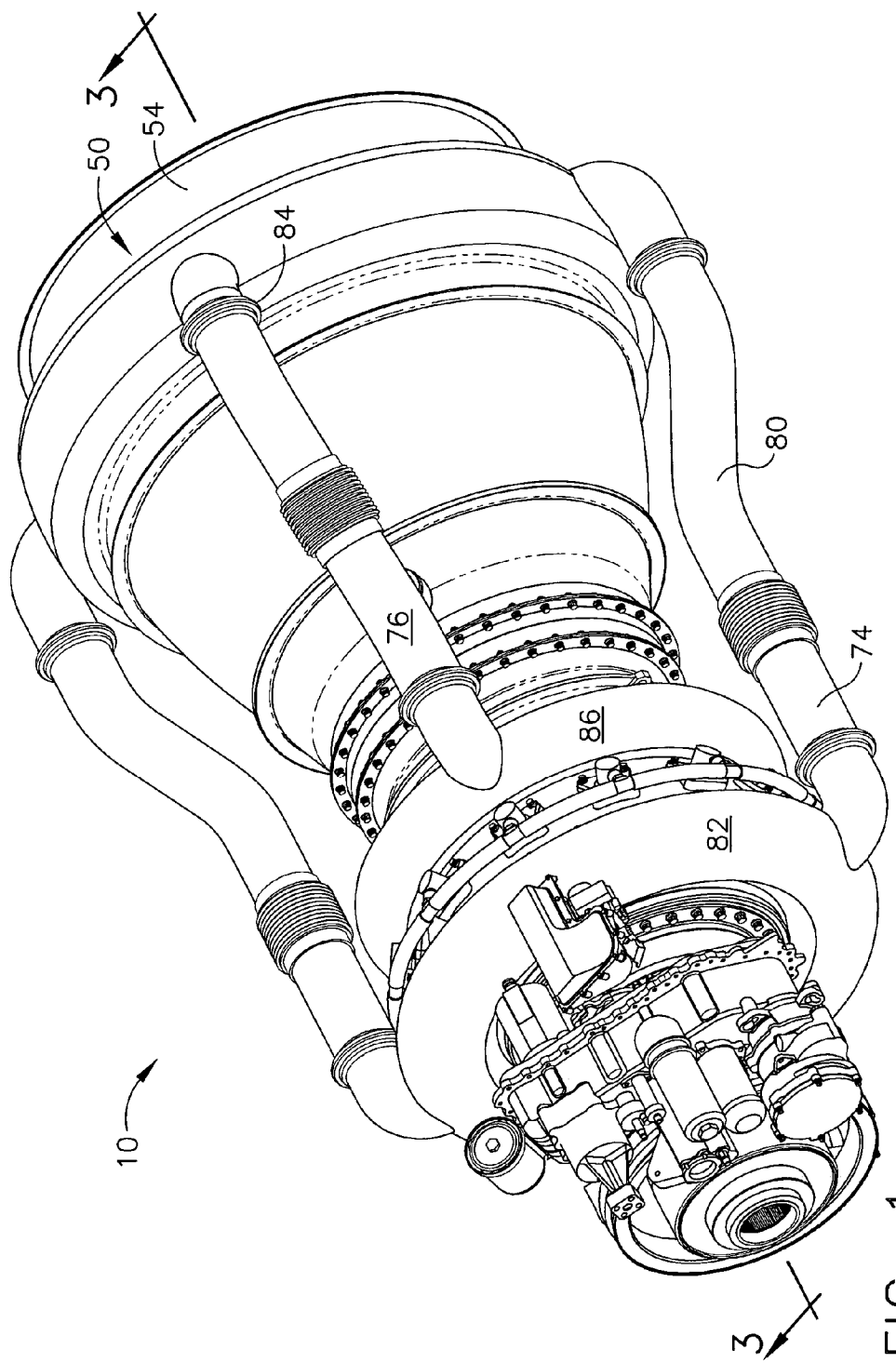
FIG. 1 is a perspective view of an exemplary gas turbine engine 10 including an exemplary heat exchanger assembly 50.
Figure 2:
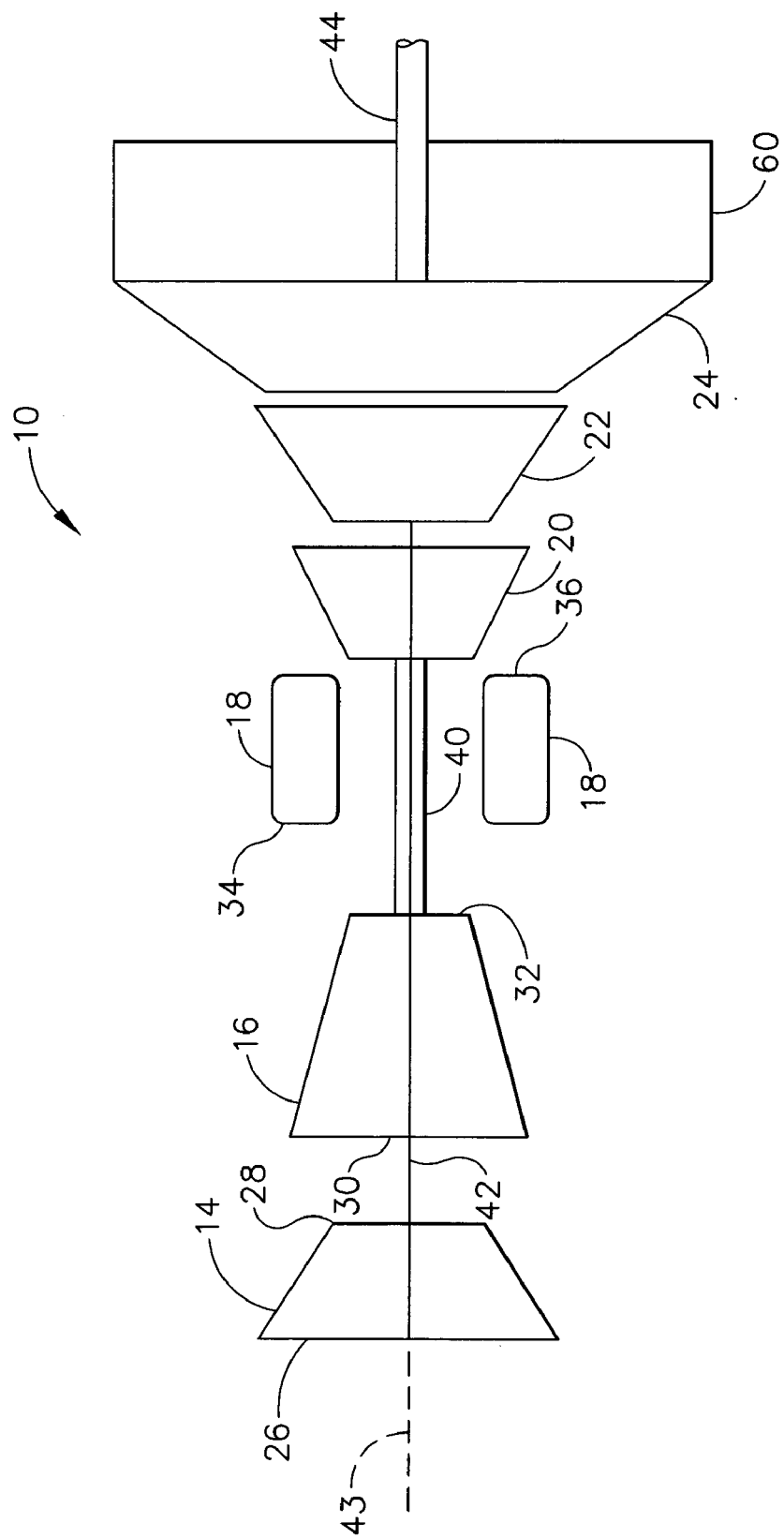
FIG. 2 is a schematic of the gas turbine engine shown in FIG. 1

FIG. 1 is a perspective view of an exemplary gas turbine engine 10 including a heat exchanger assembly 50. FIG. 2 is a block diagram of gas turbine engine 10 (shown in FIG. 1). Gas turbine engine 10 includes, in serial flow relationship, a low pressure compressor or booster 14, a high pressure compressor 16, a combustor 18, a high pressure turbine 20, a low pressure, or intermediate turbine 22, and a power turbine or free turbine 24. Low pressure compressor or booster 14 has an inlet 26 and an outlet 28, and high pressure compressor 16 includes an inlet 30 and an outlet 32. Combustor 18 has an inlet 34 that is substantially coincident with high pressure compressor outlet 32, and an outlet 36. In one embodiment, combustor 18 is an annular combustor. In another embodiment, combustor 18 is a dry low emissions (DLE) combustor.

High pressure turbine 20 is coupled to high pressure compressor 16 with a first rotor shaft 40, and low pressure turbine 22 is coupled to low pressure compressor 14 with a second rotor shaft 42. Rotor shafts 40 and 42 are each substantially coaxially aligned with respect to a longitudinal centerline axis of rotation 43 of engine 10. Engine 10 may be used to drive a load (not shown) which may be coupled to a power turbine shaft 44. Alternatively, the load may be coupled to a forward extension (not shown) of rotor shaft 42.

In operation, ambient air, drawn into low pressure compressor inlet 26, is compressed and channeled downstream to high pressure compressor 16. High pressure compressor 16 further compresses the air and delivers high pressure air to combustor 18 where it is mixed with fuel, and the mixture is ignited to generate high temperature combustion gases. The combustion gases are channeled from combustor 18 to drive turbines 20, 22, and 24.

The power output of engine 10 is at least partially related to operating temperatures of the gas flow at various locations along the gas flow path. More specifically, in the exemplary embodiment, an operating temperature of the gas flow at high-pressure compressor outlet 32, and an operating temperature of the gas flow at combustor outlet 36 are closely monitored during the operation of engine 10. Increasing an operating temperature of the gas flow entering combustor 18 facilitates increasing the specific fuel consumption of engine 10.

Figure 3:
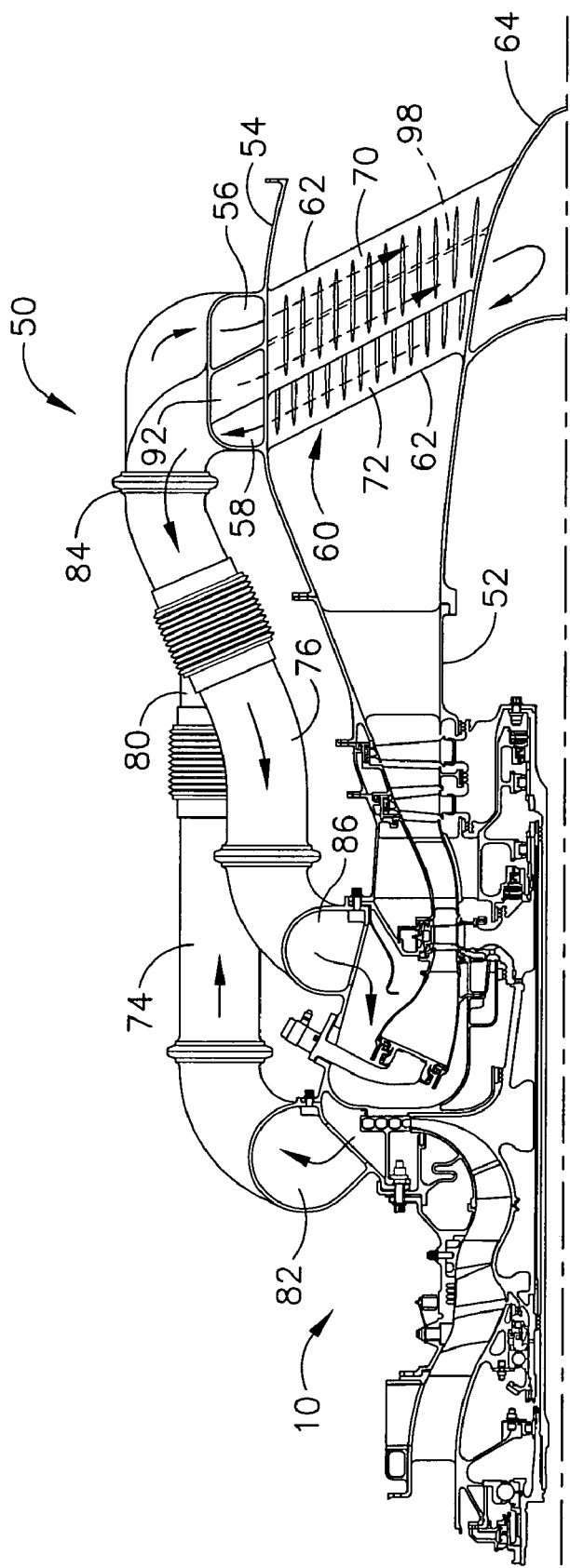
FIG. 3 is a schematic illustration of the gas turbine engine shown in FIG. 1 including the exemplary heat exchanger assembly.
Figure 4:
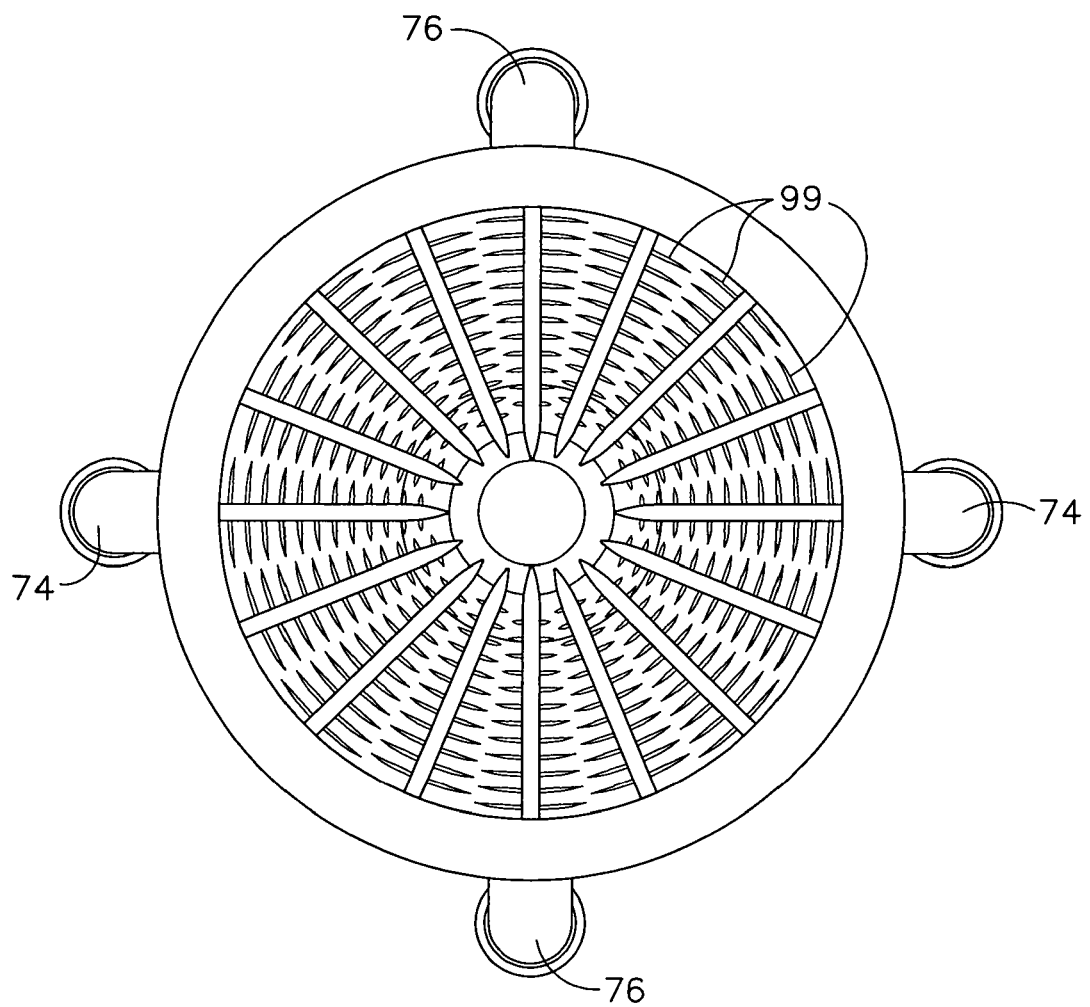
FIG. 4 is an end view of the heat exchanger assembly shown in FIG. 3.

FIG. 3 is a side view of heat exchanger assembly 50 shown in FIG. 1. FIG. 4 is an end view of heat exchanger assembly 50. In the exemplary embodiment, heat exchanger assembly 50 is removably coupled to a gas turbine rear frame 52 of gas turbine engine 10 and includes an outer casing 54, an inlet manifold 56, an outlet manifold 58, and a heat exchanger 60 coupled to outer casing 54. In one embodiment, inlet manifold 56 and outlet manifold 58 are formed unitarily together. In another embodiment, inlet manifold 56 and outlet manifold 58 are fabricated as separate components and are coupled together prior to being coupled to outer casing 54. In another embodiment, inlet manifold 56 and outlet manifold 58 are formed unitarily with outer casing 54.

Heat exchanger 60 includes a plurality of heat exchangers elements 62 that extend substantially circumferentially around an engine inside diameter between an outer periphery of a fixed plug nozzle 64 and an inner periphery of outer casing 54. Each heat exchanger element 62 includes an inlet side 70 that is in flow communication with inlet manifold 56, an outlet side 72 that is in flow communication with outlet manifold 58 and inlet side 70. Heat exchanger assembly 50 also includes a compressor discharge pipe 74, i.e., a cold pipe, that is in flow communication with inlet manifold 56, and a combustor inlet pipe 76, i.e., a hot pipe, that is in flow communication with outlet manifold 58. In the exemplary embodiment, heat exchanger 60 is an annular heat exchanger that is positioned within outer casing 54. In another embodiment, heat exchanger 60 is at least one of a radial heat exchanger and/or a cross-flow heat exchanger that is positioned within outer casing 54.

During installation of heat exchanger assembly 50, heat exchanger assembly 50 is coupled to turbine rear frame 52 such that heat exchanger 60 is aligned substantially concentrically with respect to gas turbine engine axis of rotation 43. A sealing apparatus (not shown) is positioned aft of the last stage of compressor 16 to facilitate channeling compressed air to each heat exchanger element 62 via inlet manifold 56. More specifically, in the exemplary embodiment, a first end 80 of compressor discharge pipe 74 is coupled to inlet manifold 56, and a second end 82 of compressor discharge pipe 74 is coupled to compressor 16, such that compressor 16 is coupled in flow communication with inlet manifold 56. Additionally, a first end 84 of combustor inlet pipe 76 is coupled to outlet manifold 58, and a second end 86 of combustor inlet pipe 76 is coupled to combustor 18, such that combustor 18 is coupled in flow communication with outlet manifold 58.

Figure 5:
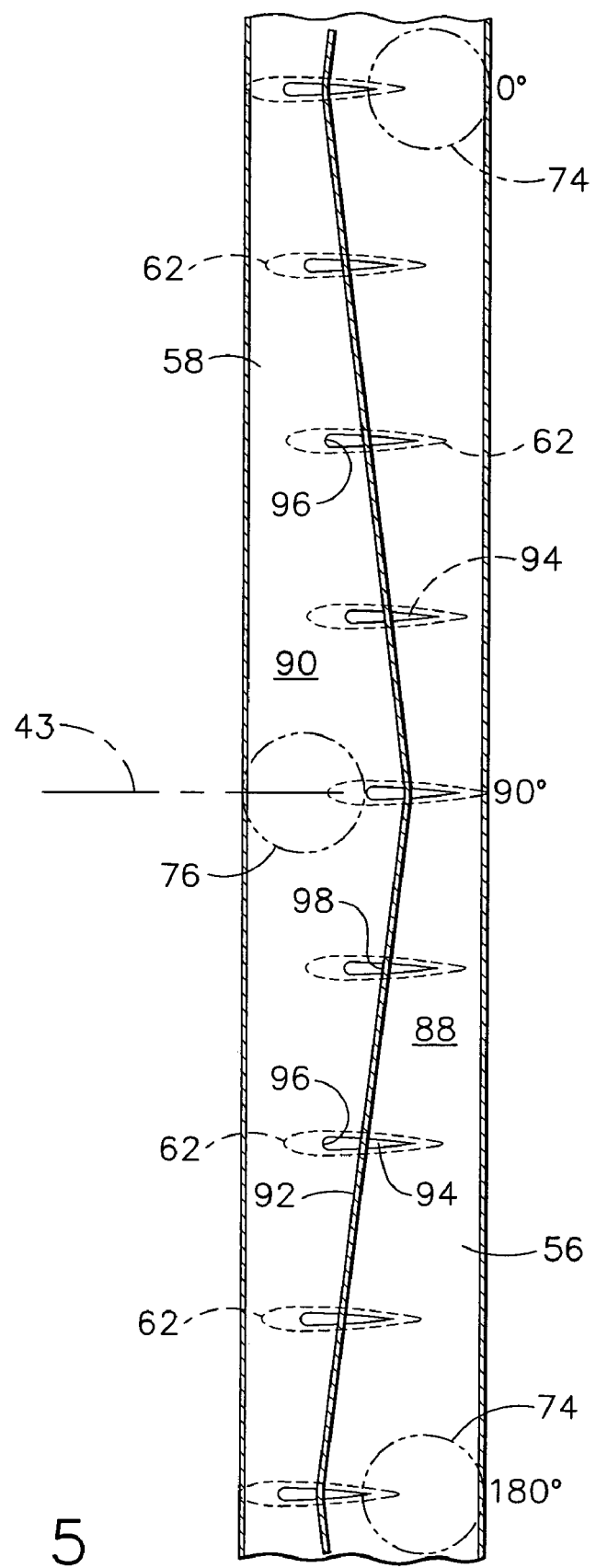
FIG. 5 is a plan view of the manifold shown in FIGS. 3 and 4.

FIG. 5 is a plan view of inlet manifold 56 and outlet manifold 58. As described herein, inlet manifold 56 and outlet manifold 58 extend 360 degrees around an outer surface of outer casing 54 although only ninety degrees of inlet manifold 56 and outlet manifold 58 are shown. Inlet manifold 56 includes a cross-sectional area 88 and outlet manifold 58 includes a cross-sectional area 90 that is inversely proportional to cross-sectional area 88. More specifically, inlet manifold 56 and outlet manifold 58 are separated by a divider 92 such that an inlet side 94 of each heat exchanger element 62 is in flow communication with inlet manifold 56 and an outlet side 96 of each heat exchanger element 62 is in flow communication with outlet manifold 58. In the exemplary embodiment, heat exchanger elements 62 are arranged such that a central axis 98 of each heat exchanger element 62 is substantially aligned with divider 92 and such that plurality of heat exchanger elements 62 form an approximately sinusoidal arrangement around an inner periphery of outer casing 54 with respect to axis of rotation 43.

During operation, compressor discharge air from compressor 16 is channeled via compressor discharge pipe 74 to inlet manifold 56. The compressor discharge air is then channeled through inlet side 70 of each heat exchanger element 62 and is placed in heat exchange with the hot exhaust gases of gas turbine engine 10. More specifically, each heat exchanger element 62 includes a plurality of heating fins 99, and the hot exhaust gases are channeled over heating fins 99 to facilitate transferring heat energy from the hot exhaust gases to the compressor discharge air. The heated compressor discharge air is then channeled through outlet side 72 of each heat exchanger element 62, through outlet manifold 58, and returned to engine 10, via combustor inlet pipe 76, whereupon the heated compressed air is channeled to combustor section 18.

The above-described heat exchanger assemblies provide a cost-effective and reliable means to facilitate increasing the specific fuel consumption of a gas turbine engine. More specifically, the heat exchanger assembly includes an annular heat exchanger that is coupled against the turbine rear frame. The annular heat exchanger is relatively small compared to known heat exchangers, thus enabling the heat exchanger to be coupled within the gas turbine engine outer casing aft of the gas turbine engine wherein known heat exchangers can not be used because of restricted space limitations.

Figure 6:
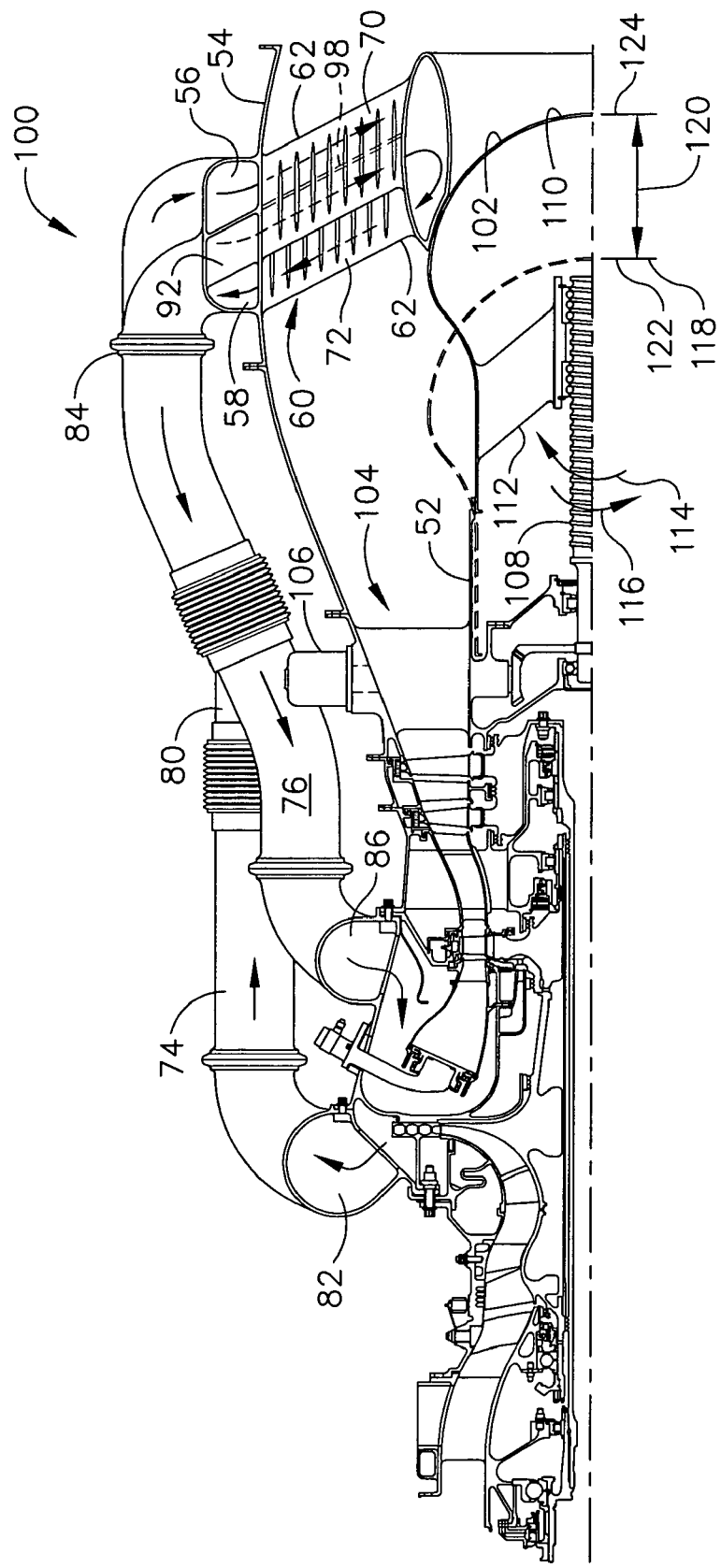
FIG. 6 is a schematic illustration of the gas turbine engine shown in FIG. 1 including an alternative embodiment of a heat exchanger assembly.

FIG. 6 is a side view of an alternative embodiment of a heat exchanger assembly 100 that can be used with gas turbine 10 (shown in FIG. 1). Heat exchanger assembly 100 is substantially similar to heat exchanger assembly 50, (shown in FIGS. 3 and 4) and components of heat exchanger assembly 100 that are identical to components of heat exchanger assembly 50 are identified in FIG. 5 using the same reference numerals used in FIGS. 3 and 4.

In the exemplary embodiment, heat exchanger assembly 100 is removably coupled to a gas turbine rear frame 52 of gas turbine engine 10 and includes an outer casing 54, an inlet manifold 56, an outlet manifold 58, and a heat exchanger 60 coupled to outer casing 54. In one embodiment, inlet manifold 56 and outlet manifold 58 are formed unitarily together. In another embodiment, inlet manifold 56 and outlet manifold 58 are fabricated as separate components and are coupled together prior to being coupled to outer casing 54. In another embodiment, inlet manifold 56 and outlet manifold 58 are formed unitarily with outer casing 54.

Heat exchanger 60 includes a plurality of heat exchanger elements 62 that extend substantially circumferentially around an engine inside diameter between an outer periphery of a variable plug nozzle 102 and an inner periphery of outer casing 54. Each heat exchanger element 62 includes an inlet side 70 that is in flow communication with inlet manifold 56, and an outlet side 72 that is in flow communication with outlet manifold 58. Heat exchanger assembly 100 also includes a compressor discharge pipe 74, i.e., a cold pipe that is in flow communication with inlet manifold 56, and a combustor inlet pipe 76, i.e., a hot pipe that is in flow communication with outlet manifold 58. In the exemplary embodiment, heat exchanger 60 is an annular heat exchanger that is positioned within outer casing 54. In another embodiment, heat exchanger 60 is at least one of a radial heat exchanger and/or a cross-flow heat exchanger that is positioned within outer casing 54.

Heat exchanger assembly 100 also includes a variable plug nozzle drive assembly 104 that includes an electric motor drive assembly 106 coupled to a drive apparatus 108. Variable plug nozzle 102 includes a nozzle 110 and a driving portion 112 coupled to nozzle 110. In the exemplary embodiment, drive apparatus 108 is a worm gear and driving portion 112 is slidably coupled to drive apparatus 108 such that when motor assembly 106 is energized, drive apparatus 108 is rotated in either a first direction 114 or a second direction 116. Rotating drive apparatus 108 in either first direction 114 or second direction 116 facilitates transitioning nozzle 102 in either a first axial direction 118 or a second axial direction 120 respectively.

During installation of heat exchanger assembly 100, heat exchanger assembly 100, including variable plug nozzle drive assembly 104, is coupled to turbine rear frame 52 such that heat exchanger 60 is aligned substantially concentrically with respect to gas turbine engine axis of rotation 43. A sealing apparatus (not shown) is positioned aft of the last stage of compressor 16 to facilitate channeling compressed air to each heat exchanger element 62 via inlet manifold 56. More specifically, in the exemplary embodiment, a first end 80 of compressor discharge pipe 74 is coupled to inlet manifold 56, and a second end 82 of compressor discharge pipe 74 is coupled to compressor 16, such that compressor 16 is coupled in flow communication with inlet manifold 56. Additionally, a first end 84 of combustor inlet pipe 76 is coupled to outlet manifold 58, and a second end 86 of combustor inlet pipe 76 is coupled to combustor 18, such that combustor 18 is coupled in flow communication with outlet manifold 58.

During operation, compressor discharge air from compressor 16 is channeled via compressor discharge pipe 74 to inlet manifold 56. The compressor discharge air is then channeled through an inlet side 70 of each heat exchanger element 62 and is placed in heat exchange with the hot exhaust gases of gas turbine engine 10. More specifically, each heat exchanger element 62 includes a plurality of heating fins 99, and the hot exhaust gases are channeled over heating fins 99 to facilitate transferring heat energy from the hot exhaust gases to the compressor discharge air. The heated compressor discharge air is then channeled through outlet side 72 of each heat exchanger element 62, through outlet manifold 58, and returned to engine 10, via combustor inlet pipe 76, whereupon the heated compressed air is channeled to combustor section 18. The heated compressor discharge air is then channeled through an outlet side 72 of each heat exchanger element 62, through outlet manifold 58 and returned to engine 10, via combustor inlet pipe 76, whereupon the heated compressed air is channeled to combustor section 18.

In one embodiment, variable nozzle assembly 102 is transitioned from a first position 122 to a second position 124 by energizing motor drive assembly 104. Energizing motor drive system 104, i.e., motor 106, rotates drive apparatus 108 in a second direction 116. Since, driving portion 112 is coupled to both driving mechanism 108 and nozzle 110, rotating driving mechanism 108 transitions nozzle 110 from a first direction 118 to a second direction 120 thus channeling a substantial portion of turbine 24 discharge air through heat exchanger 60 to facilitate heating the compressor discharge air channeled from compressor 16 through heat exchanger 60 and back to combustor 18. Heating a substantial portion of the compressor discharge air facilitates increasing the specific fuel consumption of gas turbine engine 10.

In another embodiment, energizing motor drive assembly 104 causes variable nozzle assembly 102 to transition from a second position 124 to a first position 122. Energizing motor drive system 104, i.e. motor 106, rotates drive apparatus 108 in a first direction 114. Since, driving portion 112 is coupled to both driving mechanism 108 and nozzle 110, rotating driving mechanism 108 causes nozzle 110 to transition from second direction 120 to first direction 118 thus channeling a substantial portion of turbine 24 discharge air around heat exchanger 60 and through the engine exhaust when heated combustor air is not desired.

The above-described heat exchanger assemblies provide a cost-effective and reliable means to facilitate increasing the specific fuel consumption of a gas turbine engine. More specifically, the heat exchanger assembly includes an annular heat exchanger that is coupled against the turbine rear frame. The annular heat exchanger is relatively small compared to known heat exchangers, thus enabling the heat exchanger to be coupled within the gas turbine engine outer casing aft of the gas turbine engine. The above-described heat exchanger can thus be used with a plurality of known gas turbine engines in a variety of different applications. For example, the above-described heat exchanger can be coupled to gas turbine engines used with airplanes, helicopters, and various marine applications. Moreover, the above-described heat exchanger can be used in a plurality of applications wherein known heat exchangers can not be used because of restricted space limitations.

The above-described heat exchanger assemblies can be pre-assembled prior to installing the heat exchanger assembly on the gas turbine engine. More specifically, the heat exchanger assembly can be provided as a kit that may be coupled to an existing engine. Thus, to install the heat exchanger assembly, the main components, i.e., the heat exchanger, the inlet and outlet manifolds, the nozzle, and the outer casing are pre-assembled. The main components are then coupled to the turbine rear frame, the compressor outlet pipe is coupled to the inlet manifold and the combustor inlet pipe is coupled to the outlet manifold to complete the installation on any known gas turbine engine.

Exemplary embodiments of a heat exchanger assembly are described above in detail. The heat exchanger assembly components illustrated are not limited to the specific embodiments described herein, but rather, components of each heat exchanger assembly may be utilized independently and separately from other components described herein. For example, the annular heat exchanger described above may also be used in combination with other engine combustion systems.

While the invention has been described in terms of various specific embodiments, those skilled in the art will recognize that the invention can be practiced with modification within the spirit and scope of the claims.

What is claimed is:

1. A heat exchanger assembly for a gas turbine engine, said heat exchanger assembly comprising:

an annular manifold comprising an inlet manifold coupled in flow communication with a compressor and an outlet manifold coupled in flow communication with a combustor, said annular manifold substantially concentrically aligned with respect to an axis of rotation of the gas turbine engine, and said inlet manifold and said outlet manifold adjoining each other and each including an outermost surface having a substantially equal radial distance with respect to the axis of rotation of the gas turbine engine; and an annular heat exchanger coupled in flow communication to the compressor via said annular manifold, said heat exchanger configured to channel compressor discharge air to a said combustor, said heat exchanger assembly coupled to said gas turbine engine such that said heat exchanger is substantially concentrically aligned with respect to the axis of rotation of the gas turbine engine, said heat exchanger comprising a plurality of heat exchanger elements, wherein each heat exchanger element is aligned substantially perpendicular to a direction of exhaust flow discharged substantially axially from the gas turbine engine.

2. A heat exchanger assembly in accordance with claim 1 further comprising an outer casing coupled to said heat exchanger and to a gas turbine rear frame such that said annular heat exchanger is substantially concentrically aligned with respect to the axis of rotation of the gas turbine engine.

3. A heat exchanger assembly in accordance with claim 1 further comprising a plug nozzle fixedly secured to a gas turbine rear frame to facilitate controlling an amount of exhaust flow channeled through said heat exchanger.

4. A heat exchanger assembly in accordance with claim 1 further comprising a plug nozzle coupled to a gas turbine rear frame, said plug nozzle moveable with respect to said heat exchanger to facilitate channeling exhaust flow through said heat exchanger.

5. A heat exchanger assembly in accordance with claim 4 further comprising a translation apparatus coupled to said plug nozzle to facilitate regulating the quantity of exhaust flow through said heat exchanger.

6. A heat exchanger assembly in accordance with claim 5 wherein said translation apparatus comprises at least one of a mechanical device, a hydraulic device, and a pneumatic device.

7. A heat exchanger assembly in accordance with claim 5 further comprising a drive mechanism coupled to said translation device, said drive mechanism configured to selectively translate said plug nozzle to facilitate regulating the quantity of exhaust flow through said heat exchanger.

8. A heat exchanger assembly in accordance with claim 1 wherein said heat exchanger comprises a plurality of heat exchanger elements, each said heat exchanger element comprising an inlet side in flow communication with said inlet manifold and an outlet side in flow communication with said outlet manifold.

9. A heat exchanger assembly in accordance with claim 8 wherein said inlet manifold comprises a cross-sectional area that is inversely proportional to a cross-sectional area of said outlet manifold.

10. A heat exchanger assembly in accordance with claim 1 wherein said heat exchanger elements further comprise a plurality of heating fins aligned substantially parallel to a direction of exhaust flow discharged from the gas turbine engine.

11. A gas turbine engine comprising:
a compressor;
a combustor downstream from said compressor;
a turbine coupled in flow communication with said combustor; and
a heat exchanger assembly comprising:
an annular manifold comprising an inlet manifold coupled in flow communication with said compressor and an outlet manifold coupled in flow communication with said combustor, said annular manifold concentrically aligned with respect to an axis of rotation of the gas turbine engine, and said inlet manifold and said outlet manifold adjoining each other and each including an outermost surface having a substantially equal radial distance with respect to the axis of rotation of the gas turbine engine; and
an annular heat exchanger comprising a plurality of heat exchanger elements, said heat exchanger coupled in flow communication to said compressor via said annular manifold, said heat exchanger configured to channel compressor discharge air to said combustor, said heat exchanger assembly coupled to said gas turbine engine such that said annular heat exchanger is substantially concentrically aligned with respect to the axis of rotation of the gas turbine engine, wherein each heat exchanger element is aligned substantially perpendicular to a direction of exhaust flow discharged substantially axially from the gas turbine engine.

12. A gas turbine engine in accordance with claim 11 wherein said heat exchanger assembly further comprises a plug nozzle fixedly secured to a gas turbine rear frame to facilitate controlling an amount of exhaust flow channeled through said heat exchanger.

13. A gas turbine engine in accordance with claim 11 wherein said heat exchanger assembly further comprises a plug nozzle coupled to a gas turbine rear frame, said plug nozzle moveable with respect to said heat exchanger to facilitate channeling exhaust flow through said heat exchanger.

14. A gas turbine engine in accordance with claim 13 wherein said heat exchanger assembly further comprises:
a translation apparatus coupled to said plug nozzle to facilitate regulating the quantity of exhaust flow through said heat exchanger; and
a drive mechanism coupled to said translation device, said drive mechanism configured to selectively translate said plug nozzle to facilitate regulating the quantity of exhaust flow through said heat exchanger.

* * * * *

UNITED STATES PATENT AND TRADEMARK OFFICE
CERTIFICATE OF CORRECTION

PATENT NO. : 7,254,937 B2
APPLICATION NO. : 10/828663
DATED : August 14, 2007
INVENTOR(S) : Hull et al.

It is certified that error appears in the above-identified patent and that said Letters Patent is hereby corrected as shown below:

In Claim 1, column 7, line 9, delete "air to a said" and insert therefor -- air to said --.

Signed and Sealed this

Twenty-seventh Day of November, 2007

JON W. DUDAS
*Director of the United States Patent and Trademark Office*